Patented Apr. 1, 1941

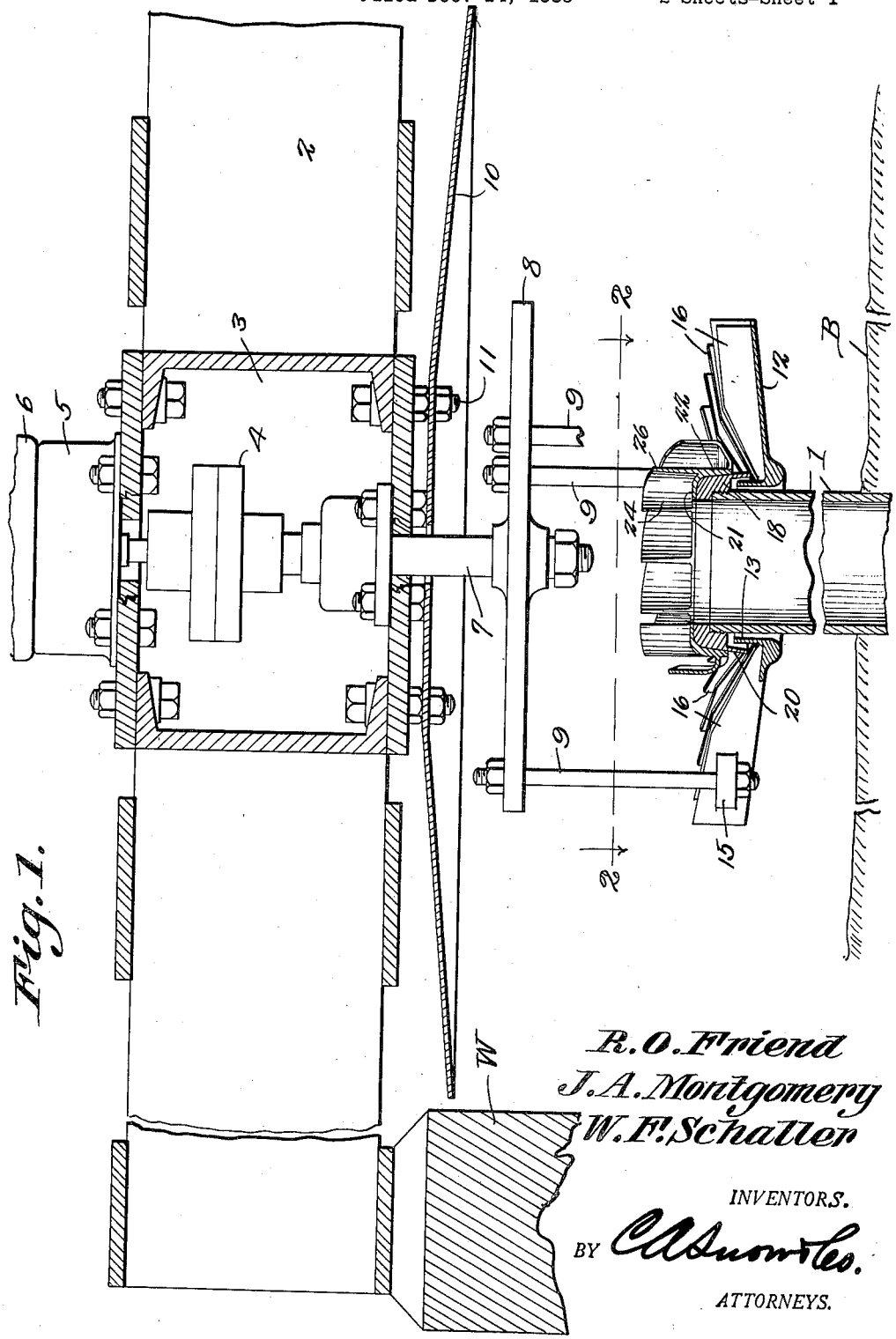

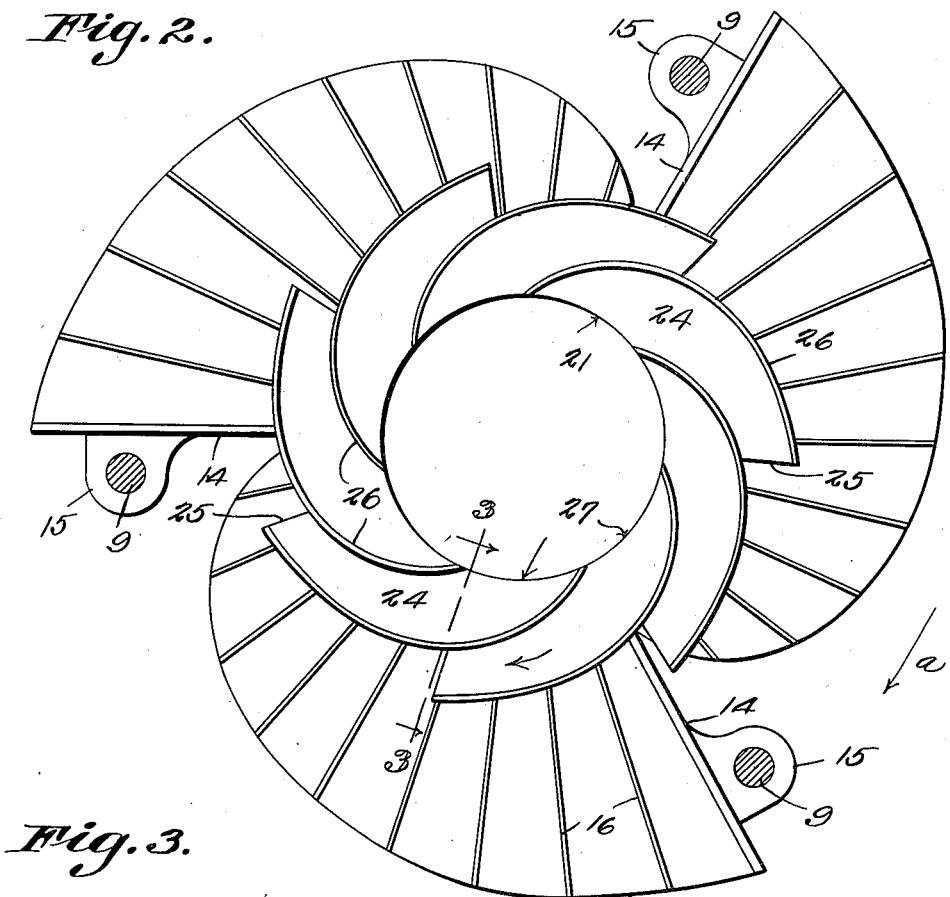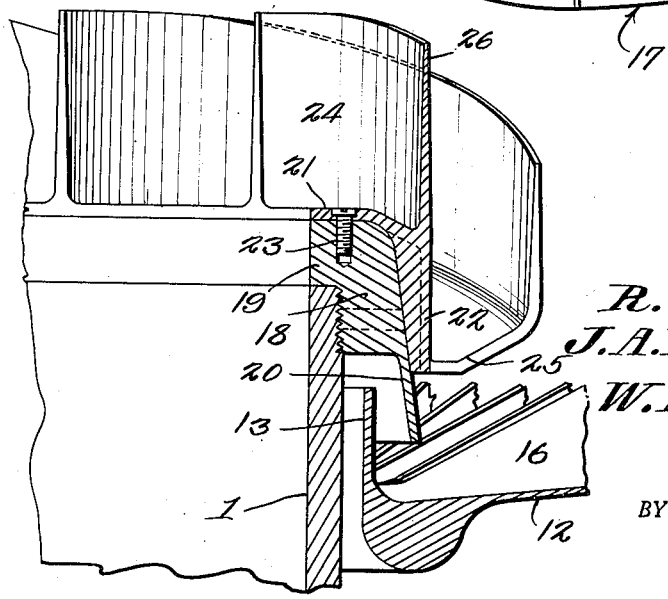
R. O. Friend
J. A. Montgomery
W. F. Schaller
INVENTORS.

2,236,943

UNITED STATES PATENT OFFICE 2,236,943

FLUID DISTRIBUTOR

Robert O. Friend, Chicago, Ill., John A. Montgomery, Denver, Colo., and William F. Schaller, La Grange, Ill.

Application December 14, 1939, Serial No. 309,256

7 Claims. (Cl. 299—63)

This invention relates to a fluid distributor for use primarily in trickling filter operation for sewage plants. It is more especially an apparatus of a type utilizing a distributor in the form of a disk having vanes upstanding therefrom whereby said disk, which is of a peculiar configuration, will operate to distribute fluid evenly over the surface of a filtering bed.

Heretofore it has been the practice to direct the fluid downwardly onto the disk from the upper end of a stand pipe on which the disk has been mounted for rotation. The fluid, falling substantially at right angles to the surface of the disk, has tended to retard the rotation of the disk because of the inertia to be overcome. Consequently the power usually required for operating the disk has been excessive under some conditions.

It is an object of the present invention to provide a new and novel means whereby the fluid will be distributed onto a revolving disk in separate streams flowing substantially in the direction of rotation of the disk whereby the power required to operate the disk will be reduced materially and the efficiency of the apparatus as a distributor will be increased.

A further object is to combine with the distributing disk a diffusing cone fixedly mounted on the outlet end of a stand pipe where it will be in position to receive the fluid as it flows from the stand pipe, dividing the liquid into separate streams which can be directed onto the vanes of the revolving disk without retarding their rotation.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the drawings accompanying this description we have shown the preferred form of our invention.

In said drawings

Figure 1 is a central vertical section through a distributing disk and diffusing cone operatively mounted on a stand pipe, portions of the associated apparatus being shown partly in elevation and partly in section.

Figure 2 is an enlarged section on line 2—2, Figure 1.

Figure 3 is a section on an enlarged scale taken on the line 3—3, Figure 2.

Referring to the figures by characters of reference, 1 designates a stand pipe or feed pipe adapted to be fixedly mounted at the center of a filter such as used, for example, in the well known Halvorson-Smith process of sewage treatment. The upper end of this pipe terminates at a suitable distance above the level of the filtering bed or media indicated generally at B. In the structure illustrated a beam 2 or other structure of sufficient strength bridges the filtering media and can be mounted on the walls of the filter, one of these being indicated at W. This bridging structure can also include a housing 3 for a shaft coupling 4 operatively connected to speed reduction gearing indicated generally at 5 and which, in turn, can be driven by a motor generally designated at 6. A depending shaft 7 is driven through coupling 4 and gearing 5 by the motor and is above but coaxial with the pipe 1. This shaft carries a disk 8 which rotates therewith and has hangers 9 regularly spaced.

A splash plate 10 is fixedly connected to the bridging structure as at 11 and can be concavo-convex as shown. This plate is preferably concentric with shaft 7 and is of course located above disk 8.

The distributing disk has been indicated at 12 and is mounted for rotation on pipe 1. This disk has an upwardly extending flange 13 at its inner edge. The surface of the disk is inclined upwardly and outwardly away from the flange and is formed with any desired number of radial edges 14 regularly spaced and having ears 15 extending therefrom and engaged by the hangers 9 so that the disk is thus supported for rotation.

Upstanding vanes 16 are disposed radially on the disk and extend from the outer edge of the disk inwardly to the flange 13. Those portions of the disk 12 between the radial edges 14 have their outer edges curved forwardly and inwardly in the direction of rotation of the disk, as shown particularly in Figure 2, and each curved edge is extended from the outer end of one radial edge 14 to the inner end of the next radial edge 14 in advance thereof. The radial wings 16 extend to the outer edges of the segments formed between the edges 14 and the arc described by each of the curved edges 17 of the disk is directly proportional, in practice, to the area of the bed on which liquid is to be discharged. Obviously the length of the vanes is reduced in regular succession forwardly from the radial edge 14 of the segment on which the vanes are located, the rear or longest vane 16 being adapted to discharge the liquid on the outer portion of the bed B while the shortest vanes deliver the liquid onto the bed close to the pipe 1.

A diffusing disk such as has been described has heretofore been supplied with liquid overflowing from the upper end of pipe 1 and falling straight down onto the disk. In driving the disk it has been necessary to overcome the inertia of the falling liquid and the constant beating of the vanes across this liquid has resulted not only in loss of power but also in undesirable splashing.

For the purpose of avoiding the objections above recited a new and novel diffusing means has been provided for cooperation with the disk. As shown in Figures 1 and 3 a collar 18 is mounted on the upper end of the pipe, this collar being integral with a ring 19 which bears on the end of the pipe and is flush with the inner surface thereof. Collar 18 has a depending flange 20 extending around but spaced from flange 13 and terminating above the wings or vanes 16. The diffusing cone is fitted over and about ring 19 and collar 18 and includes a ring 21 having a depending flange 22. Ring 21 is flush with the inner surface of ring 19 and is secured thereto in any suitable manner, as by means of bolts 23.

An annular series of arcuate channels 24 is integral with ring 21 and all of these channels are curved in the direction in which disk 12 thereunder rotates and are inclined downwardly to discharge openings or outlets 25. The channels have their walls 26 extended above ring 21 but these walls terminate substantially flush with the inner surface of ring 1, thereby providing an annular series of inlets 27 opening into the respective channels 24 into which liquid rising from pipe 1, will overflow.

Disk 12 is adapted to be rotated in the direction indicated by arrow $a$ in Figure 2 and during this rotation liquid delivered onto the disk will be expelled outwardly between the vanes 16 so as to be delivered over all portions of the filter bed. To avoid loss of power and objectionable splashing, the liquid will not fall straight down onto disk 12 from the pipe 1. Instead it will flow through inlets 27 into the annular series of downwardly extending arcuate channels 24 and be delivered in separate streams at the outlets 25 and in the direction in which disk 12 is rotating. As momentum is thus imparted to the streams as they leave the outlet 25 and as this momentum is in the direction of rotation of disk 12, there will be no tendency to retard the rotation of the disk but, instead, the liquid will be transferred smoothly from channels 24 to the channels between vanes 16. Thus excessive agitation is avoided, there is practically no inertia to be overcome, and swirling and splashing is prevented. Consequently the apparatus will operate with maximum efficiency and with minimum power.

What is claimed is:

1. In filtering apparatus the combination with a feed pipe and a distributing disk mounted for rotation on the pipe, said disk having upstanding radial vanes, of means mounted on and extending around the pipe for directing overflowing fluid from said pipe and onto the rotating disk in the direction of rotation of the disk.

2. In filtering apparatus the combination with an upstanding feed pipe and a distributing disk mounted for rotation thereon, said disk having upstanding radial vanes, of diffusing means positioned on the pipe to receive liquid overflowing therefrom, said means including an annular series of downwardly inclined arcuate channels having outlets overlying the path of the vanes.

3. In filtering apparatus the combination with an upstanding feed pipe and a distributing disk mounted for rotation thereon, said disk having upstanding radial vanes, of diffusing means positioned on the pipe to receive liquid overflowing therefrom, said means including an annular series of arcuate channels having inlets positioned to receive liquid overflowing from the pipe, all of said channels being inclined downwardly from said inlets in the direction of rotation of the disk, there being outlets at the lower ends of the channels overlying the disk.

4. In filtering apparatus the combination with an upstanding feed pipe, a distributing disk extending therearound, and means for rotating the disk continuously in one direction, said disk having upstanding radial vanes, of a structure having an annular series of channels extending around the pipe and positioned to receive liquid overflowing therefrom, said channels being inclined downwardly toward and in the direction of rotation of the disk.

5. A diffusing cone for use with the distributing disk of a filter, comprising a structure including bottom and side walls providing an annular series of downwardly inclined arcuate channels for attachment to the delivery end of an upstanding feed pipe, each channel having an inlet at its upper end and an outlet at its lower end.

6. A diffusing cone for use with the distributing disk of a filter, comprising a structure having an annular series of arcuate channels having bottoms inclined downwardly in one direction, said channels having arcuate walls providing inlets at the upper ends of the channels for receiving liquid overflowing from the area surrounded by the channels.

7. A diffusing cone including a ring having side and bottom walls providing an annular series of channels inclined downwardly, said channels having their walls projecting above the ring to provide an annular series of radial inlets to the channels, all of the channels being arcuate and curved in the same direction.

ROBERT O. FRIEND.
JOHN A. MONTGOMERY.
WILLIAM F. SCHALLER.